US012663277B2

(12) United States Patent
Kumar et al.

(10) Patent No.: US 12,663,277 B2
(45) Date of Patent: Jun. 23, 2026

(54) METHOD AND SYSTEM FOR BLOCK SCHEDULING FOR ELECTRIC VEHICLE WITH INTRADAY CHARGING

(71) Applicant: Siemens Aktiengesellschaft, Munich (DE)

(72) Inventors: Abhay Kumar, Bangalore (IN); Deepak Nagar, New Delhi (IN); Vinay Ramanath, Bengaluru (IN); Smaran Subbaiah Bommanda Ganapathi, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 132 days.

(21) Appl. No.: 18/632,681

(22) Filed: Apr. 11, 2024

(65) Prior Publication Data

US 2024/0361136 A1 Oct. 31, 2024

(30) Foreign Application Priority Data

Apr. 27, 2023 (EP) ..................................... 23170414

(51) Int. Cl.
*G01C 21/34* (2006.01)
*B60L 58/12* (2019.01)
(52) U.S. Cl.
CPC .......... *G01C 21/3469* (2013.01); *B60L 58/12* (2019.02); *B60L 2260/54* (2013.01)
(58) Field of Classification Search
CPC . G01C 21/3469; B60L 58/12; B60L 2260/54;

B60L 2240/60; B60L 2240/80; B60L 2260/44; B60L 3/12; B60L 53/68; G06Q 10/04; G06Q 10/047; H02J 7/0048
See application file for complete search history.

(56) References Cited

PUBLICATIONS

Moradipari, Ahmadreza, et al. "Mobility-aware smart charging of electric bus fleets." 2020 IEEE Power & Energy Society General Meeting (PESGM). IEEE, 2020. (Year: 2020).*

(Continued)

*Primary Examiner* — Alan D Hutchinson
(74) *Attorney, Agent, or Firm* — Schmeiser, Olsen & Watts, LLP

(57) ABSTRACT

A system and method for block scheduling for an electric vehicle are provided. The method includes obtaining route information including designated routes and their distances in a defined operation period for the EV, and battery information including a consumption factor and a charging rate for a battery of the EV. The method further includes adding dummy routes representative of a predefined charging time period for the battery in the defined operation period. The method further includes defining a dummy factor having a first value for each of the designated routes for the energy being consumed, and a second value for each of the dummy routes for the energy being replenished. The method further includes determining a schedule for the designated routes and the dummy routes for the EV using an optimization model having constraints for the route information, the battery information and the dummy factor.

10 Claims, 7 Drawing Sheets

(56) References Cited

PUBLICATIONS

Shu, Jun et al; "Locational Price Driven Electric Bus Fleet Operation and Charging Demand Management"; 2021 IEEE/IAS Industrial and Commercial Power System Asia; published: Jul. 18, 2021; pp. 409-413; XP034037273; DOI: 10.1109/ICPSASIA52756.2021.9621397.

Rong, A et al; "A Review on Electric Bus Charging Scheduling from Viewpoints of Vehicle Scheduling"; 2021 IEEE international conference on industrial engineering and engineering management; published: Dec. 13, 2021; pp. 1-5; XP034068482; DOI: 10.1109/IEEM50564.2021.9673069.

Moradipari, Ahmadreza et al; "Mobility-Aware Smart Charging of Electric Bus Fleets"; Arxiv. org; Cornell University library; published: Dec. 11, 2019; XP081550273, 5 pages.

* cited by examiner

METHOD AND SYSTEM FOR BLOCK SCHEDULING FOR ELECTRIC VEHICLE WITH INTRADAY CHARGING

CROSS-REFERENCE TO RELATED APPLICATIONS

This application claims priority to EP application Ser. No. 23170414.9, having a filing date of Apr. 27, 2023, the entire contents of which are hereby incorporated by reference.

FIELD OF TECHNOLOGY

The following generally relates generally to route scheduling and optimization for electric vehicles (EVs), and more specifically to a method and system for block schedule for EVs that considers intraday charging to maximize EV utilization, reduce carbon emissions, and increase operational efficiency in commercial fleets.

BACKGROUND

Electric vehicles (EVs) are an essential solution for mitigating pollution and exhaust emissions resulting from the consumption of petroleum-based fuels. As the world progressively shifts towards electrification of commercial vehicles, fleet operators face the complex challenge of effectively integrating EVs into their operations. One critical aspect that affects the efficient use of EVs is route scheduling, which can have a significant impact on battery life, charging infrastructure requirements, and overall operational costs. Most fleet operators currently employ manual scheduling or basic algorithms to allocate EVs to schedule routes. However, these approaches often lack the sophistication needed to optimize EV utilization, considering factors such as battery capacity, charging times, energy consumption, and various constraints related to the EV and the assigned routes.

Route scheduling is a critical factor that influences the overall utilization of electric vehicles. Consequently, researchers have been actively working on the development of advanced scheduling algorithms to optimize EV deployment. Prior studies have implemented a Mixed Integer Linear Programming (MILP) based mathematical optimization approach for optimally assigning a plurality of EVs to routes, subject to capacity constraints. The problem is formulated as a multi-objective optimization problem, with the primary objective being the improvement of EV utilization. Such algorithm employs a decremental State of Charge (SoC) model, in which the SoC can either remain constant or decrease during scheduling. However, this approach does not account for intraday charging.

In light of the above, there remains a need for an improved EV route scheduling algorithm that incorporates intraday charging capabilities, thereby enhancing overall EV utilization and promoting environmental and operational benefits.

Embodiments of the invention seek to overcome these challenges by enabling the SoC to increase during scheduling, permitting EVs to be assigned to longer routes. This enhanced approach leads to higher EV utilization, maximized depot earnings, and reduced carbon emissions. By incorporating intraday charging into the route scheduling process, embodiments of the invention offer a more comprehensive and efficient solution for managing commercial electric vehicle fleets, contributing to both environmental and operational improvements.

SUMMARY

An aspect relates to a computer-implemented method for block scheduling for an electric vehicle (EV). In embodiments, the method comprises obtaining route information and battery information associated with the EV, wherein the route information comprises designated routes in a defined operation period for the EV and a distance to be covered in each of the designated routes for the EV, and wherein the battery information comprises a consumption factor representative of an energy consumed to cover a unit distance from a battery of the EV and a charging rate representative of the energy replenished per unit time of charging for the battery of the EV. In embodiments, the method further comprises adding dummy routes in the defined operation period for the EV, wherein each of the dummy routes is representative of a predefined charging time period for the battery of the EV. In embodiments, the method further comprises defining a dummy factor having a first value for each of the designated routes indicative of the energy from the battery of the EV being consumed, and a second value for each of the dummy routes indicative of the energy of the battery of the EV being replenished. In embodiments, the method further comprises determining a schedule for the designated routes and the dummy routes for the EV by computing a solution for an optimization model having constraints for the route information, the battery information and the dummy factor.

In embodiments, the method further comprises defining a battery constraint for the EV based on a maximum capacity for the battery of the EV, a pre-defined safety margin for the battery of the EV and an input state-of-charge (SoC) of the battery of the EV.

In embodiments, the optimization model provides that a sum of a product of a decision variable with value being '1' if any one of the designated routes or the dummy routes is assigned to the EV and '0' otherwise, a distance of each of the designated routes and the dummy routes, the consumption factor, and the dummy factor is within '0' and the battery constraint for all of the designated routes and the dummy routes in the defined operation period for the EV.

In embodiments, the distance of each of the dummy routes is based on a ratio of a product of the charging rate the predefined charging time period over the consumption factor, for the battery for the EV.

In embodiments, the dummy factor has a value of '+1' for each of the designated routes and a value of '−1' for each of the dummy routes, for substitution in the optimization model.

In embodiments, the schedule for the designated routes and the dummy routes for the EV is determined for a time slot between an end time of a first designated route for the EV and a start time of a last designated route for the EV, in the defined operation period for the EV.

embodiments, the solution for the optimization model is computed with the desire to achieve a maximum distance to be covered by the EV for the designated routes therefor, in the defined operation period for the EV.

An aspect of the present invention is also achieved by a system for block scheduling for an electric vehicle (EV). In embodiments, the system comprises an interface configured to obtain route information and battery information associated with the EV, wherein the route information comprises designated routes in a defined operation period for the EV and a distance to be covered in each of the designated routes for the EV, and wherein the battery information comprises a consumption factor representative of an energy consumed to cover a unit distance from a battery of the EV and a charging rate representative of the energy replenished per unit time of charging for the battery of the EV. In embodiments, the system also comprises a processor a memory coupled to the processor, wherein the memory comprises instructions which, when executed by the processor, configures the processor to: add dummy routes in the defined operation period for the EV, wherein each of the dummy routes is representative of a predefined charging time period for the battery of the EV; define a dummy factor having a first value for each of the designated routes indicative of the energy from the battery of the EV being consumed, and a second value for each of the dummy routes indicative of the energy of the battery of the EV being replenished; and determine a schedule for the designated routes and the dummy routes for the EV by computing a solution for an optimization model having constraints for the route information, the battery information and the dummy factor.

An aspect of the present invention is further achieved by a computer program code which, when executed by a processor, cause the processor to carry out steps of the aforementioned method.

An aspect of the present invention is further achieved by a computer program product (non-transitory computer read-able storage medium having instructions, which when executed by a processor perform actions) having computer program code causing the processor to carry out steps of the aforementioned method.

Still other aspects, features, and advantages of embodi-ments of the invention are readily apparent from the fol-lowing detailed description, simply by illustrating a number of particular embodiments and implementations, including the best mode contemplated for carrying out the invention. The invention is also capable of other and different embodi-ments, and its several details may be modified in various obvious respects, all without departing from the scope of the invention. Accordingly, the drawings and description are to be regarded as illustrative in nature, and not as restrictive.

BRIEF DESCRIPTION

Some of the embodiments will be described in detail, with reference to the following figures, wherein like designations denote like members, wherein.

DETAILED DESCRIPTION

In the following description, for the purpose of explana-tion, numerous specific details are set forth in order to provide thorough understanding of embodiments. It may be evident that such embodiments may be practiced without these specific details.

Examples of a method, a system, and a computer-program product for block scheduling for an electric vehicle (EV) are disclosed herein. In the following description, for the pur-poses of explanation, numerous specific details are set forth in order to provide a thorough understanding of the embodi-ments of the invention. It is apparent, however, to one skilled in the conventional art that the embodiments of the invention may be practiced without these specific details or with an equivalent arrangement. In other instances, well-known structures and devices are shown in block diagram form in order to avoid unnecessarily obscuring the embodiments of the invention.

Figure 1:
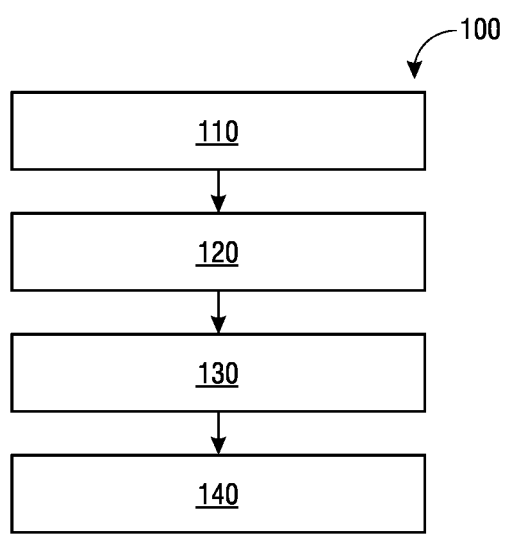
FIG. 1 is a flowchart representation of a computer-implemented method for block scheduling for an electric vehicle (EV), in accordance with embodiments of the pres-ent invention.

Referring now to FIG. 1, illustrated is a flowchart of a method (as represented by reference numeral 100) for block scheduling for an electric vehicle (EV), in accordance with an embodiment of the present invention. As used herein, block scheduling refers to the process of dividing daily operational time into discrete, continuous periods or "blocks" during which the EV performs its assigned routes and charging events. This approach aims to enhance the efficient utilization of EVs in commercial fleets by organiz-ing and managing their activities, including routing and charging, within these predefined time intervals in the defined operation period for the EV. Block scheduling may involve assigning specific time periods for intraday charg-ing, which allows fleet operators to strategically plan and schedule charging events during the defined operation period for the EV. By incorporating intraday charging into block scheduling, EV is enabled to maintain a sufficient State of Charge (SoC) to handle longer routes or additional tasks while minimizing downtime and disruptions.

As discussed, embodiments of the present invention involve incorporating intraday charging capabilities into the scheduling process, allowing for increased utilization of electric vehicles in commercial fleets. As used herein, intra-day charging is a strategic approach to managing charging of a battery of the EV in a defined operation period for the EV. This involves planning and scheduling charging events at charging stations for the EV between assigned designated routes. Intraday charging takes into account factors such as the EV's SoC, charging speed, and route constraints. By enabling an increase in the SoC during the day, vehicles can be assigned to longer routes, handle more tasks, or accommodate additional stops for recharging without significant impacts on their overall operational efficiency.

Figure 2:
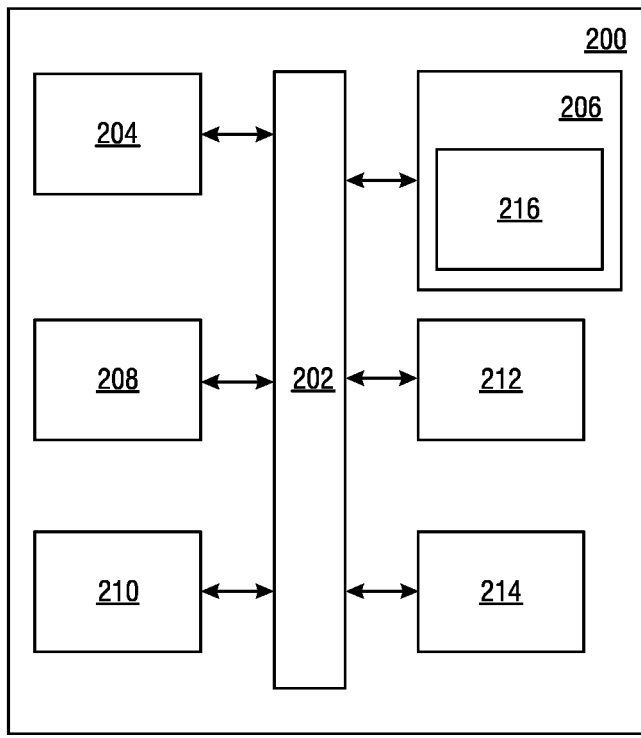
FIG. 2 is a block diagram representation of a system for block scheduling for the EV, in accordance with embodi-ments of the present invention.

Referring to FIG. 2, illustrated is a block diagram of a system 200 for block scheduling for an EV, in accordance with embodiments of the present invention. It may be appreciated that the system 200 described herein may be implemented in various forms of hardware, software, firmware, special purpose processors, or a combination thereof. The present embodiments may take a form of a computer program product comprising program modules accessible from computer-usable or computer-readable medium storing program code for use by or in connection with one or more computers, processors, or instruction execution system. For the purpose of this description, a computer-usable or computer-readable medium may be any apparatus that may contain, store, communicate, propagate, or transport the program for use by or in connection with the instruction execution system, apparatus, or device. The medium may be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and digital versatile disc (DVD). Both processors and program code for implementing each aspect of the technology may be centralized or distributed (or a combination thereof) as known to those skilled in the conventional art.

In an embodiment, the system 200 may be embodied as a computer-program product 200 programmed for performing the purpose. In embodiments, the system 200 may be incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the computing device may be implemented in a single chip. As illustrated, the system 200 includes a communication mechanism such as a bus 202 for passing information among the components of the system 200. In embodiments, the system 200 includes a processor 204 and a memory 206. Herein, the memory 206 is communicatively coupled to the processor 204. In an embodiment, the memory 206 may be embodied as a computer readable medium on which program code sections of a computer program are saved, the program code sections being loadable into and/or executable in a system to make the system 200 execute the steps for performing the purpose.

Generally, as used herein, the term "processor" refers to a computational element that is operable to respond to and processes instructions that drive the system 200. In some embodiments, the processor includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the term "processor" may refer to one or more individual processors, processing devices and various elements associated with a processing device that may be shared by other processing devices. Additionally, the one or more individual processors, processing devices and elements are arranged in various architectures for responding to and processing the instructions that drive the system 200.

Herein, the memory 206 may be volatile memory and/or non-volatile memory. The memory 206 may be coupled for communication with the processor 204. In embodiments, the processor 204 may execute instructions and/or code stored in the memory 206. A variety of computer-readable storage media may be stored in and accessed from the memory 206. The memory 206 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like.

In embodiments, the processor 204 has connectivity to the bus 202 to execute instructions and process information stored in the memory 206. In embodiments, the processor 204 may include one or more processing cores with each core configured to perform independently. A multi-core processor enables multiprocessing within a single physical package. Examples of a multi-core processor include two, four, eight, or greater numbers of processing cores. Alternatively, or in addition, the processor 204 may include one or more microprocessors configured in tandem via the bus 202 to enable independent execution of instructions, pipelining, and multithreading. In embodiments, the processor 204 may also be accompanied with one or more specialized components to perform certain processing functions and tasks such as one or more digital signal processors (DSP), and/or one or more application-specific integrated circuits (ASIC). Other specialized components to aid in performing the inventive functions described herein include one or more field programmable gate arrays (FPGA) (not shown), one or more controllers (not shown), or one or more other special-purpose computer chips.

In embodiments, the system 200 may further include an interface 208, such as a communication interface (with the terms being interchangeably used) which may enable the system 200 to communicate with other systems for receiving and transmitting information. The communication interface 208 may include a medium (e.g., a communication channel) through which the system 200 communicates with other system. Examples of the communication interface 208 may include, but are not limited to, a communication channel in a computer cluster, a Local Area Communication channel (LAN), a cellular communication channel, a wireless sensor communication channel (WSN), a cloud communication channel, a Metropolitan Area Communication channel (MAN), and/or the Internet. In some embodiments, the communication interface 208 may include one or more of a wired connection, a wireless network, cellular networks such as 2G, 3G, 4G, 5G mobile networks, and a Zigbee connection.

In embodiments, the system 200 also includes a database 210. As used herein, the database 210 is an organized collection of structured data, typically stored in a computer system and designed to be easily accessed, managed, and updated. The database 210 may be in form of a central repository of information that can be queried, analysed, and processed to support various applications and business processes. In the system 200, the database 210 provides mechanisms for storing, retrieving, updating, and deleting data, and typically includes features such as data validation, security, backup and recovery, and data modelling.

In embodiments, the system 200 further includes an input device 212 and an output device 214. The input device 212 may take various forms depending on the specific application of the system 200. In an embodiment, the input device 212 may include one or more of a keyboard, a mouse, a touchscreen display, a microphone, a camera, or any other hardware component that enables the user to interact with the system 200. Further, the output device 214 may be in the form of a display. It is to be understood that, when reference is made in the present invention to the term "display" this refers generically either to a display screen on its own or to the screen and an associated housing, drive circuitry and possibly a physical supporting structure, of which all, or part of is provided for displaying information.

In the present system 200, the processor 204 and accompanying components have connectivity to the memory 206 via the bus 202. The memory 206 includes both dynamic memory (e.g., RAM, magnetic disk, writable optical disk, etc.) and static memory (e.g., ROM, CD-ROM, etc.) for storing executable instructions that when executed perform the method steps described herein for block scheduling for the EV. In embodiments, the memory 206 includes a module arrangement 216 to perform steps for block scheduling for the EV. Also, in the system 200, the memory 206 may be configured to store the data associated with or generated by the execution of the inventive steps.

Referring to FIGS. 1 and 2 in combination, the various steps of the method 100 as described hereinafter may be executed in the system 200, or specifically in the processor 204 of the system 200, for block scheduling for the EV. For purposes of the present invention, the present method 100 is embodied as a scheduling algorithm for block scheduling for the EV, with the two terms being interchangeably used hereinafter. It may be appreciated that although the method 100 is illustrated and described as a sequence of steps, it may be contemplated that various embodiments of the method 100 may be performed in any order or a combination and need not include all of the illustrated steps.

In embodiments of the present invention, at step 110, the method 100 includes obtaining route information and battery information associated with the EV. This data may be gathered from a fleet management system, which typically tracks and manages various aspects of fleet operations, including route planning and vehicle maintenance for the EV. To gather this information, the system 200 may interface with the fleet management system through an Application Programming Interface (API) or other data exchange mechanisms, via the interface 208. Once the route information and the battery information has been obtained, those can be stored in the database 210, which serves as a central repository for the data required by the system 200. The database 210 may be designed using relational or non-relational database management systems, depending on the specific requirements and preferences of the system 200.

Herein, the route information comprises designated routes in a defined operation period for the EV and a distance to be covered in each of the designated routes for the EV. In the present context, the defined operation period for the EV refers to a specific time window during which the EV is expected to complete its assigned routes and other activities. This operation period is typically established by the fleet operator based on factors such as operational demands and resource availability. The defined operation period can range from a single day to multiple days or even weeks, depending on nature and specific needs of the fleet operations. During the operation period, the EV needs to cover its designated routes while also ensuring that its battery maintains a sufficient SoC to meet the energy requirements of the journey. Designated routes refer to the predetermined paths assigned to the EV during their defined operation period. These designated routes are typically planned by the fleet management system to meet operational demands and customer requirements. The designated routes often have specific start and end points, along with intermediate stops. The distance of designated routes refers to a total length (in distance units) that the EV needs to travel to complete a specific route assigned to it. This distance is calculated by summing the lengths of all segments between the start point, intermediate stops, and the end point of the designated route.

Further, herein, the battery information comprises a consumption factor representative of an energy consumed to cover a unit distance from a battery of the EV and a charging rate representative of the energy replenished per unit time of charging for the battery of the EV. The battery information is vital for efficient scheduling for the EV. The consumption factor represents the energy consumed by the EV to cover a unit distance, such as a kilometre or mile. It is usually expressed in terms of kilowatt-hours per unit distance (kWh/km or kWh/mi) or miles per kilowatt-hour (mi/kWh). The charging rate represents the energy replenished in the EV's battery per unit time of charging. It is typically expressed in kilowatts (kW) or sometimes as a percentage of the battery's capacity per unit time. By considering the consumption factor and the charging rate, the present method 100 can accurately determine the energy consumption and charging requirements for the EV on its designated routes. This information enables to optimize the utilization of the EV, ensuring that the EV meets its scheduling requirements while minimizing energy consumption.

At step 120, the method 100 includes adding dummy routes in the defined operation period for the EV. Herein, each of the dummy routes is representative of a predefined charging time period for the battery of the EV. Adding dummy routes in the defined operation period for the EV enables the scheduling algorithm to incorporate intraday charging capability. The dummy routes represent predefined charging time periods for the battery of the EV, allowing the scheduling algorithm to simulate and schedule charging events during the operation period. Each dummy route is created by assigning a specific time duration for charging, which could be a fixed interval (e.g., 30 minutes) or a variable interval based on the fleet operator's preferences and charging infrastructure availability. These dummy routes do not represent actual driving routes but are placeholders for charging sessions, which the scheduling algorithm can include in the scheduling process as if they were regular routes. This approach helps optimize the utilization of the EV by considering its charging needs in the scheduling process, ensuring that the EV has sufficient energy to complete its assigned routes while taking advantage of available charging opportunities during the operation period. Incorporating dummy routes in the scheduling algorithm also allows for better adaptability to varying charging rates, battery capacities, and energy consumption factors among different EVs in the fleet. The scheduling algorithm can assign suitable number of dummy routes to each EV based on their specific battery information, enabling the fleet to maximize its overall efficiency and reduce environmental impact.

At step 130, the method 100 includes defining a dummy factor having a first value for each of the designated routes indicative of the energy from the battery of the EV being consumed, and a second value for each of the dummy routes indicative of the energy of the battery of the EV being replenished. Defining the dummy factor in the scheduling algorithm helps to differentiate between the energy consumption of the designated routes and the energy replenishment during the dummy routes. The dummy factor is assigned a first value for each of the designated routes, representing the energy consumed by the EV's battery while traveling along those routes. On the other hand, the dummy factor is assigned a second value for each of the dummy routes, which represents the energy replenishment in the EV's battery during the charging sessions. By using the dummy factor with two distinct values for designated routes and dummy routes, the scheduling algorithm can effectively model and optimize the utilization of EVs, considering their energy consumption and charging requirements. This approach enables the scheduling algorithm to assign appropriate charging times and locations during the operation period, ensuring that the EVs have sufficient energy to complete their designated routes while taking advantage of available charging opportunities.

In the present embodiments, the dummy factor has a value of '+1' for each of the designated routes and a value of '−1' for each of the dummy routes, for substitution in the optimization model. That is, the first value for the dummy factor is usually set as '+1,' signifying that energy is being consumed during the designated routes; and the second value for the dummy factor is usually set as '−1,' signifying that energy is being replenished or added back to the battery during the dummy routes. The negative sign in the second value helps distinguish it from the energy consumption in the designated routes and ensures that the scheduling algorithm accounts for both energy consumption and replenishment events, when substituted in the optimization model.

At step 140, the method 100 includes determining a schedule for the designated routes and the dummy routes for the EV by computing a solution for an optimization model having constraints for the route information, the battery information and the dummy factor. That is, in order to determine a schedule for both the designated routes and the dummy routes for the EV, the method 100 employs a computational solution to an optimization model that takes into account various constraints associated with route information, battery information, and the dummy factor. The route information constraint is incorporated into the optimization model to ensure that the EV is assigned to designated routes in a manner that adheres to the route's specific requirements, such as start and end times, distance, and order of execution. These constraints help the optimization model to generate a schedule that is consistent with the actual operational requirements of the EV fleet. The battery information constraints is incorporated in the optimization model to manage the energy consumption and charging needs of the EV. These constraints take into account factors such as the consumption factor and charging rate for the battery of the EV. The dummy factor constraints is incorporated into the optimization model to represent the energy replenishment during the dummy routes, which are the charging sessions scheduled within the defined operation period for the EV. The dummy factor is assigned a first value for each of the designated routes, indicating energy consumption by the EV's battery, and a second value for each of the dummy routes, representing energy replenishment in the battery during the predefined charging time period.

Herein, the optimization model is a mathematical formulation that aims to find the best possible solution to a problem while considering various constraints and objectives. In the present embodiments, the optimization model is a Mixed-Integer Linear Programming (MILP) model. MILP is a type of optimization problem that combines linear programming (LP) techniques with integer constraints. In a mixed-integer linear programming problem, some of the decision variables are required to take integer values, while others can take continuous values. This combination of integer and continuous variables allows MILP models to address a wide range of real-world problems, such as scheduling, routing, and resource allocation. The optimization model employed in the present method 100 seeks to optimally schedule the designated routes and dummy routes for the EV, considering constraints related to route information, battery information, and the dummy factor. By solving the optimization model, the method 100 aims to determine a schedule that maximizes the utilization of EVs in the fleet and manages their energy consumption and charging sessions effectively.

In embodiments, the method 100 further includes defining a battery constraint for the EV based on a maximum capacity for the battery of the EV, a pre-defined safety margin for the battery of the EV and an input state-of-charge (SoC) of the battery of the EV. The battery constraint ensures that the EV's battery usage remains within acceptable limits while completing the designated routes and charging sessions, when substituted in the optimization model (as described in the proceeding paragraphs). This battery constraint is based on three primary factors: the maximum capacity of the battery for the EV, the predefined safety margin for the battery, and the input SoC of the battery. The maximum capacity of the battery factor represents the total energy storage capacity of the EV's battery. By considering the maximum capacity, the optimization model can account for the physical limitations of the battery and prevent the EV from being assigned to routes or charging sessions that would exceed its energy storage capabilities. The safety margin is a percentage value that represents a buffer to ensure the battery does not reach critically low levels of charge, which could potentially leave the EV stranded without power while performing any of the designated routes. Incorporating the safety margin into the battery constraint helps the optimization model maintain a minimum SoC for the battery at the end of any designated route or charging session. The input SoC, also expressed as a percentage, represents the initial charge level of the battery at the start of the defined operation period. By considering the input SoC, the optimization model can accurately estimate the available energy for the EV at any stage of the scheduling process, ensuring that the generated schedule takes into account the EV's starting energy levels. The battery constraint considers these factors of the EV's battery, ensuring that the scheduling algorithm adheres to the battery's limitations.

In the present embodiments, the optimization model provides that a sum of a product of a decision variable, a distance of each of the designated routes and the dummy routes, the consumption factor, and the dummy factor is within '0' and the battery constraint for all of the designated routes and the dummy routes in the defined operation period for the EV. Herein, the decision variable is used to determine whether a particular designated route or dummy route is assigned to a particular EV, with value being '1' if any one of the designated routes or the dummy routes is assigned to the EV and '0' otherwise. In the optimization model, the goal is to determine an optimal schedule for the EV by assigning designated routes and dummy routes while considering energy consumption and charging requirements. The optimization model achieves this by ensuring that the sum of the product of these variables (decision variable, distance, consumption factor, and dummy factor) for all the designated routes and dummy routes in the defined operation period for the EV is within 'O' and the battery constraint. Thus, the optimization model aims to achieve a balanced state in which the sum of the energy consumed and the energy replenished over all of the designated routes and the dummy routes in the defined operation period for the EV falls within a permissible range, considering the battery constraint.

According to embodiments of the present invention, the optimization model is given by:

$$\left(0 \leq \sum_{r=1}^{R}(B2R_{r,b} * Dist_r * CF_{r,b} * d\_factor_r) \leq \right.$$

$$\left. maxBatteryCap_b * (1 - safetyMargin) * inputSoc_b \right) \forall\, b, R \in Bus, Route$$

wherein:
B2R$_{r,b}$ is a decision variable, with value being '1' if any one of the designated route "r" and the dummy route "r" is assigned to EV "b" and '0' otherwise;
Dist$_r$ is a distance of the designated route "r" or a distance of the dummy route "r", in distance units;
CF$_{r,b}$ is the consumption factor in charge per distance units;
d$_{factor_r}$ is the dummy factor;
maxBatteryCap$_b$ is the maximum capacity of the battery for the EV "b" in charge units;
safetyMargin is the pre-defined safety margin representative of a minimum SoC for the battery for end of any one of designated routes "r" for the EV "b" in percentage; and
inputSoc$_b$ is the input SoC representative of available charge at start of corresponding one of designated routes "r" for the EV "b" in percentage.

Herein, the distance of each of the dummy routes is based on a ratio of a product of the charging rate the predefined charging time period over the consumption factor, for the battery for the EV. That is, in case of the dummy factor with the value of '+1', the distance of the designated route "r" is applied in the optimization model. Further, in case of the dummy factor with the value of '−1', the distance of the dummy route "r" is applied in the optimization model, in which the distance of the dummy route "r" is given by:

$$Dist_r = \frac{C_{rate} * t_s}{CF_{D,b}}$$

wherein:
C$_{rate}$ is the charging rate;
t$_s$ is a charging time for the dummy route; and
CF$_{D,b}$ is the consumption factor.

In an embodiment, the solution for the optimization model is computed with objective to achieve a maximum distance to be covered by the EV for the designated routes therefor, in the defined operation period for the EV. That is, in the optimization model, the objective function is defined to maximize the distance covered by the EV in the defined operation period for the designated routes. This objective function is formulated by summing up the distances of all designated routes that have been assigned to the EV. Since the EV has a limited battery capacity, it is important to maximize the distance covered by the EV within the battery constraint. The optimization model is solved by an MILP solver to determine the optimal schedule for the designated routes and dummy routes, which is the solution that maximizes the objective function while satisfying all the constraints. By solving this optimization problem, the method 100 can assign routes to the EV while also ensuring that the battery constraints are met, and that the EV can cover as much distance as possible within the operation period.

Figure 3:
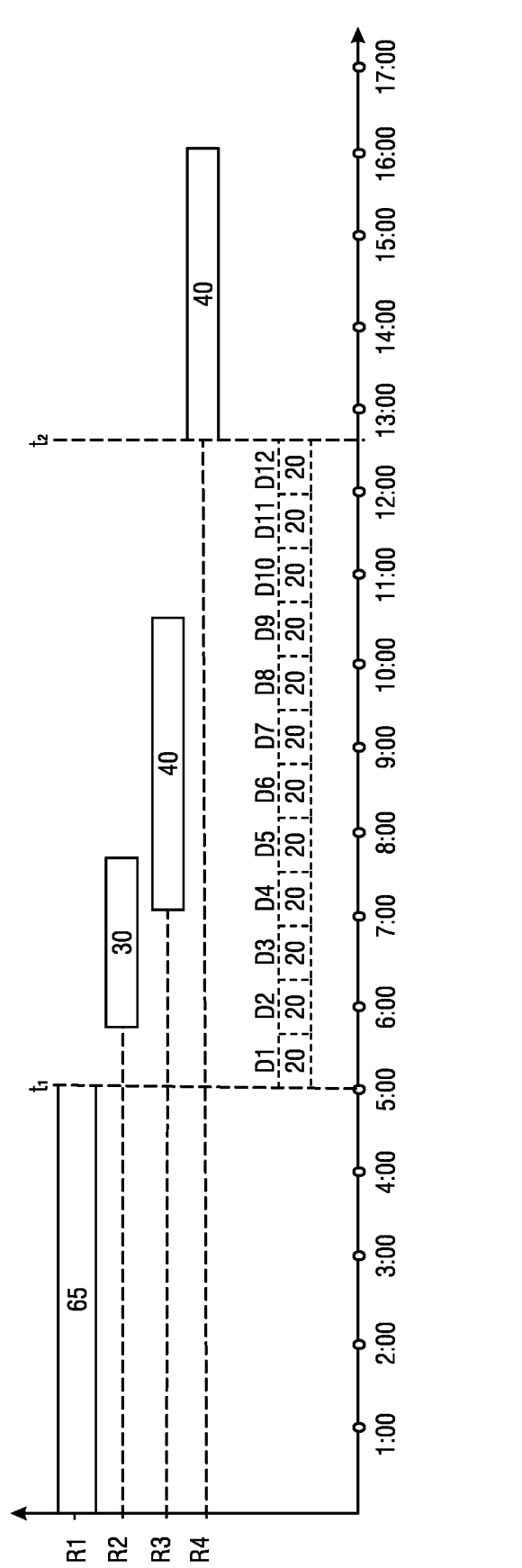
FIG. 3 is a representation of a planning process for intraday charging in a defined operation period for the EV, in accordance with embodiments of the present invention.

In embodiments of the present invention, the schedule for the designated routes and the dummy routes for the EV is determined for a time slot between an end time of a first designated route for the EV and a start time of a last designated route for the EV, in the defined operation period for the EV. Referring to FIG. 3, illustrated is a representation of a planning process (as represented by reference numeral 300) for intraday charging in the defined operation period for the EV. As shown, the dummy routes (D1, D2, . . . , D12) are introduced between a period that begin at t1 (end of first designated route R1) and ends at t2 (start of last designated route R4), while keeping the designated routes (R1, R2, R3, and R4) in the order of their start time. In the illustrated example, each of the dummy routes D1-D12 has a default value of 20 (representing 20% of charge replenishment of the maximum battery capacity). Further, in the illustrated example, the designated route 'R1' has a value of 65 (representing 65% of charge utilization of the maximum battery capacity); the designated route 'R2' has a value of 30 (representing 30% of charge utilization of the maximum battery capacity); the designated route 'R3' has a value of 40 (representing 40% of charge utilization of the maximum battery capacity); and the designated route 'R4' has a value of 40 (representing 40% of charge utilization of the maximum battery capacity).

Further, herein, the time slot 't2-t1' between the end time of the first designated route 'R1' for the EV and the start time of the last designated route 'R4' for the EV is chosen for intraday charging by introduction of the dummy routes 'D1-D12' as it represents the actual operational time period during which the EV battery needs to be charged. This is so because before the start of the first designated route 'R1' for the EV, it may be assumed that the battery of the EV is fully charged, say, from overnight charging. Similarly, after the end of the last designated route 'R4' for the EV, it may be assumed that the battery of the EV will be charged from overnight charging which is not considered part of intraday charging as per the present invention. Thus, it is important to schedule the charging of the battery during this time slot 't2-t1' to ensure that the battery has enough charge to complete all the designated routes, while also considering the maximum battery capacity and the pre-defined safety margin. By optimizing the charging schedule within this time slot, the overall efficiency of the EV operation can be improved.

Figure 4:
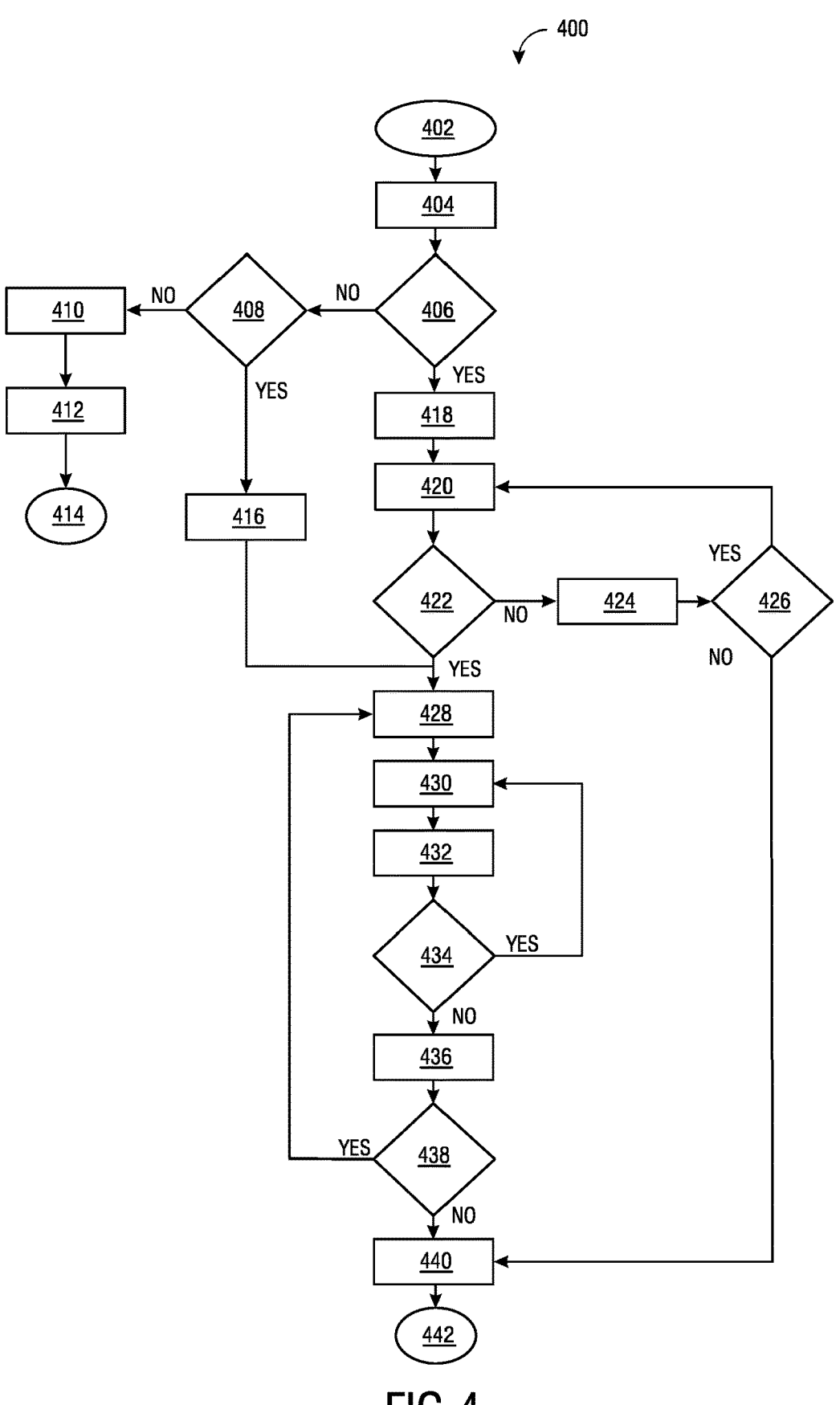
FIG. 4 is a flowchart of a workflow for block scheduling for a fleet of EVs, in accordance with embodiments of the present invention.

Referring to FIG. 4, illustrated is a flowchart of a workflow 400 for block scheduling for a fleet of EVs, based on the methodology describe in the preceding paragraphs. The workflow 400 starts at step 402. At step 404, the workflow 400 involves implementing an API to obtain information required for block scheduling for the EVs (such as, using the interface 208 to obtain the route information and the battery information for each EV in the fleet of EVs, from the fleet management system or the like). At step 406, the workflow 400 involves checking for configuration of a period flag which defines the defined operation period for each of the EVs. If the period flag is set to NO, then at step 408, the workflow 400 involves checking for intraday charging flag, i.e., if intraday charging is desired or not. If the intraday charging flag is set to NO, then at step 410, the workflow 400 involves preparing the EV for automatic dispatch; and at step 412, the workflow 400 involves preparing block schedule and charging schedule (like overnight charging) for the EV; and then the workflow ends at step 414. In case of the intraday charging flag being set to YES at the step 408, then at step 416, the workflow 400 involves setting i=1 and n=1, where 'i' represents a given operation day in the defined operation period, and 'n' represents a number of days in the defined operation period. Also, in case of the period flag being set to be YES at the step 406, then at step 418, the workflow 400 involves first setting i=1 and splitting the block list as per the operational day 'i' with i in [1,n]; and further at step 420, the workflow 400 involves preparing input for the day 'i'. Further, at step 422, the workflow 400 involves checking for intraday charging flag. If this intraday charging flag is set to NO at the step 422, the workflow 400 involves, at step 424, to prepare the EV for automatic dispatch for set day 'i' and then set i=i+1. Thereafter, at step 426, the workflow 400 involves checking that if i<=n; and if YES, the workflow 400 loops back to step 420.

On the other hand, if the intraday charging flag is set to YES at the step 422, then the workflow 400 moves to step 428 in which the workflow 400 involves considering for EV type 'j' which is generally indicative of number of passengers that the EV can accommodate and thus, in consideration, may accordingly be assigned route herein, as with routes with maximum demand may be assigned the EV with maximum capacity for the passengers. At the step 428, the workflow 400 involves, setting j=1 for j in [1,t] with 't' representing all types of EVs available and for day 'i', creating dummy routes. Then, at step 430, the workflow 400 involves creating input for the EV type 'j'. Thereafter, at step 432, the workflow 400 involves automatic dispatching for the EV type 'j' and post that setting j=j+1 for next EV type. Then, at step 434, the workflow 400 involves checking if j<=t; and if YES, then the workflow 400 continues by looping back to step 430; and if NO, then, at step 436, the workflow 400 involves merging the output and preparing the block schedule (including charging schedule) for the day 'i', and then setting i=i+1. Thereafter, at step 438, the workflow 400 involves checking if i<=n; and if YES, the workflow 400 loops back to the step 428 for carrying the process for next operation days; and if NO, then at step 440, the workflow 400 involves merging the output and thereby preparing block schedule for all days in the defined operation period for the EV. Finally, the workflow 400 ends at step 442.

Figure 5:
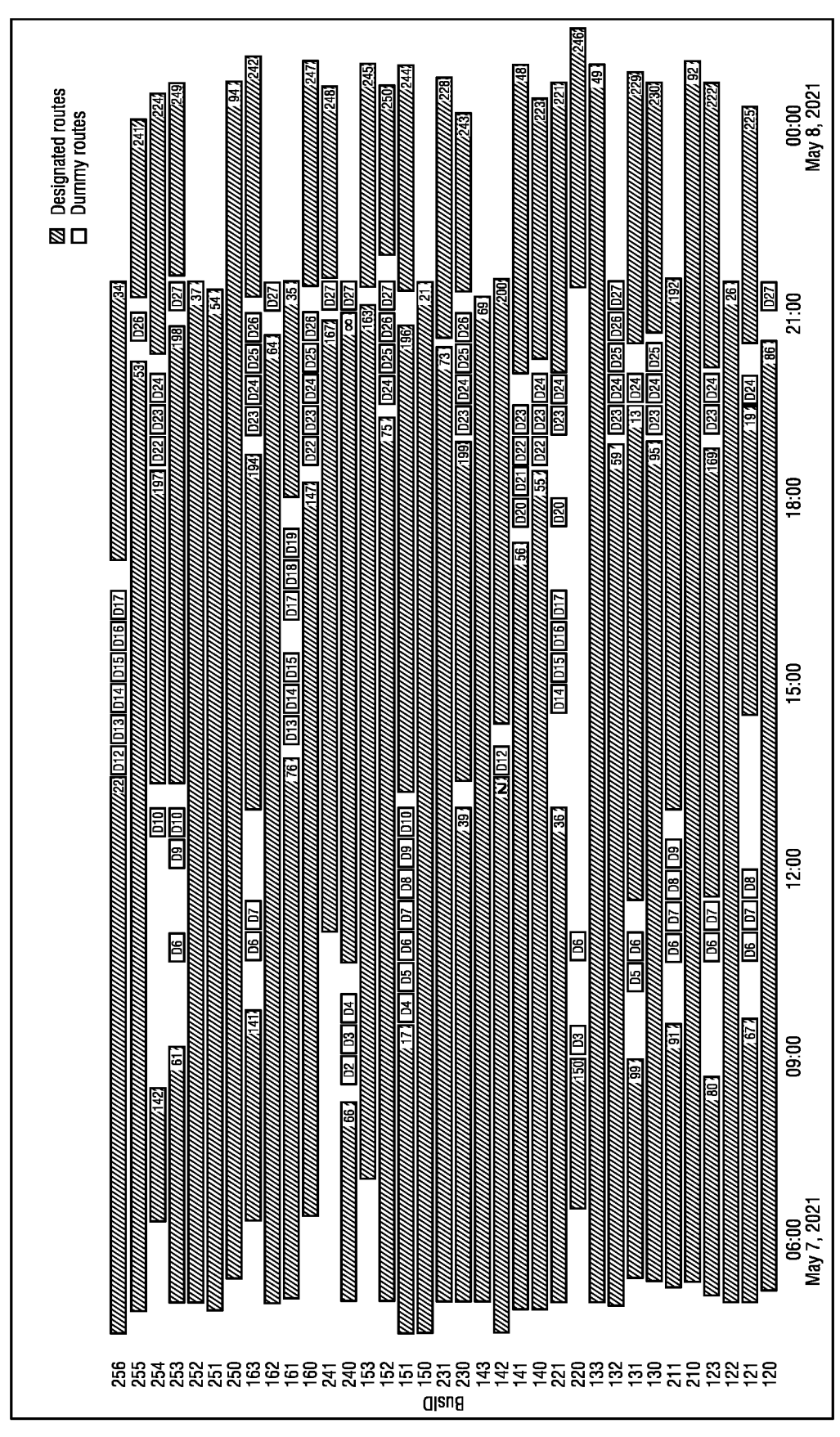
FIG. 5 is an exemplary representation of an output pro-viding bus to route mapping based on the block scheduling for the fleet of EVs, in accordance with embodiments of the present invention.

In embodiments of the present invention, the computed optimal schedule is presented as an output, including the assignment of designated routes and the dummy routes for the EV, and optionally the respective distances, energy consumption details, and energy replenishment details. FIG. 5 is an exemplary representation of an output (as represented by reference numeral 500) providing bus to route mapping based on the block scheduling for the fleet of EVs, in accordance with embodiments of the present invention. The output 500 provides a mapping of each EV (shown by Bus IDs in a range of 120 to 256) in the fleet to a set of designated routes and dummy routes within the defined operation period (shown for an exemplary operational day having a period between 06:00 of May 7, 2021 up to 00:00 of May 8, 2021), such that the energy consumed and the energy replenished over the designated routes and the dummy routes for each EV is within the battery constraint (including safety margin constraint), and the maximum distance to be covered by each EV for the designated routes is achieved.

Figure 6B:
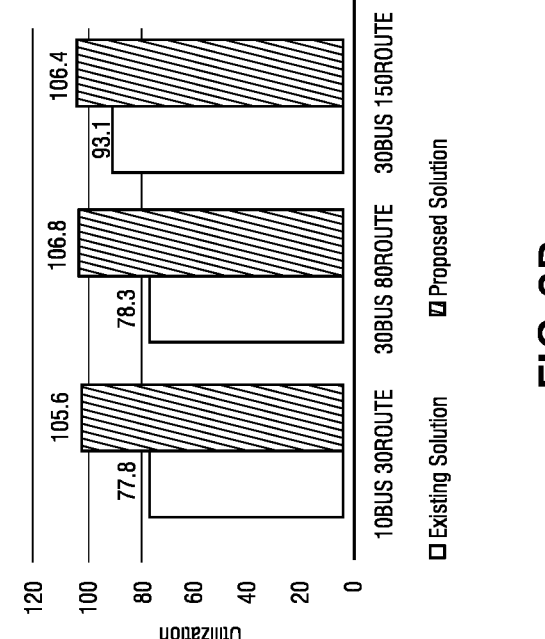
FIG. 6B is an exemplary graphical depiction of compari-son of EV utilization achieved using existing solution based on decremental SoC and proposed solution for block sched-uling with intraday charging, in accordance with embodi-ments of the present invention.
Figure 6A:
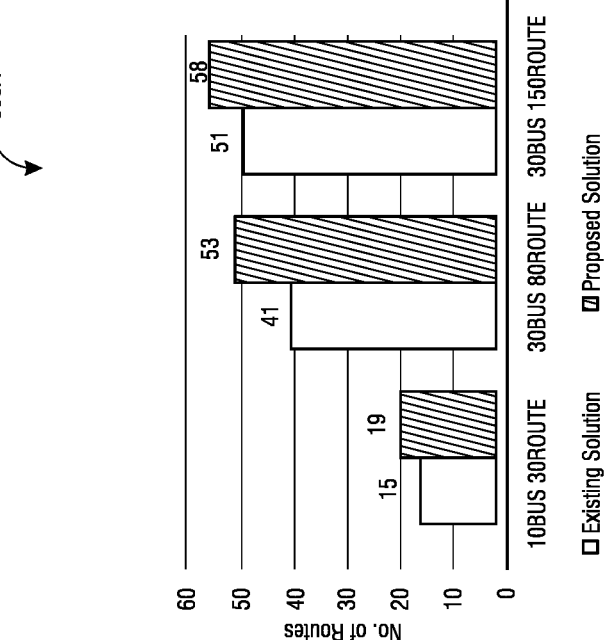
FIG. 6A is an exemplary graphical depiction of compari-son of number of routes achieved using existing solution based on decremental state-of-charge (SoC) and proposed solution for block scheduling with intraday charging, in accordance with embodiments of the present invention.

The proposed approach offers several benefits over traditional EV scheduling methods. By incorporating intraday charging events through the use of dummy (charging)

routes, the scheduling algorithm enables more number of routes to be covered by the EV and more efficient utilization of EVs, allowing them to cover longer distances without the need for excessive charging infrastructure. This results in reduced operational costs, increased depot earnings, and lower carbon emissions. FIG. 6A is an exemplary histogram plot 600A showing comparison of number of routes achieved using existing solution based on decremental state-of-charge (SoC) (shown as undashed plots) and proposed solution for block scheduling with intraday charging (shown as dashed plots) for three exemplary scenarios. It may be concluded that the number of routes that may be covered by the EV by implementing the proposed solution has increased by 20% on average compared to the existing solutions. Further, FIG. 6B is an exemplary histogram plot 600B showing comparison of utilization of EV achieved using existing solution based on decremental state-of-charge (SoC) (shown as undashed plots) and proposed solution for block scheduling with intraday charging (shown as dashed plots) for similar three exemplary scenarios. The results indicate that the proposed method 100 of block scheduling with intraday charging significantly improves the routes covered by the EV and the utilization of EVs. It may be concluded that the utilization of the EV by implementing the proposed solution has increased by 20% on average compared to the existing solutions. It may be appreciated that this is achieved by the proposed solution by assigning multiple routes to the EV with intraday charging.

Figure 7:
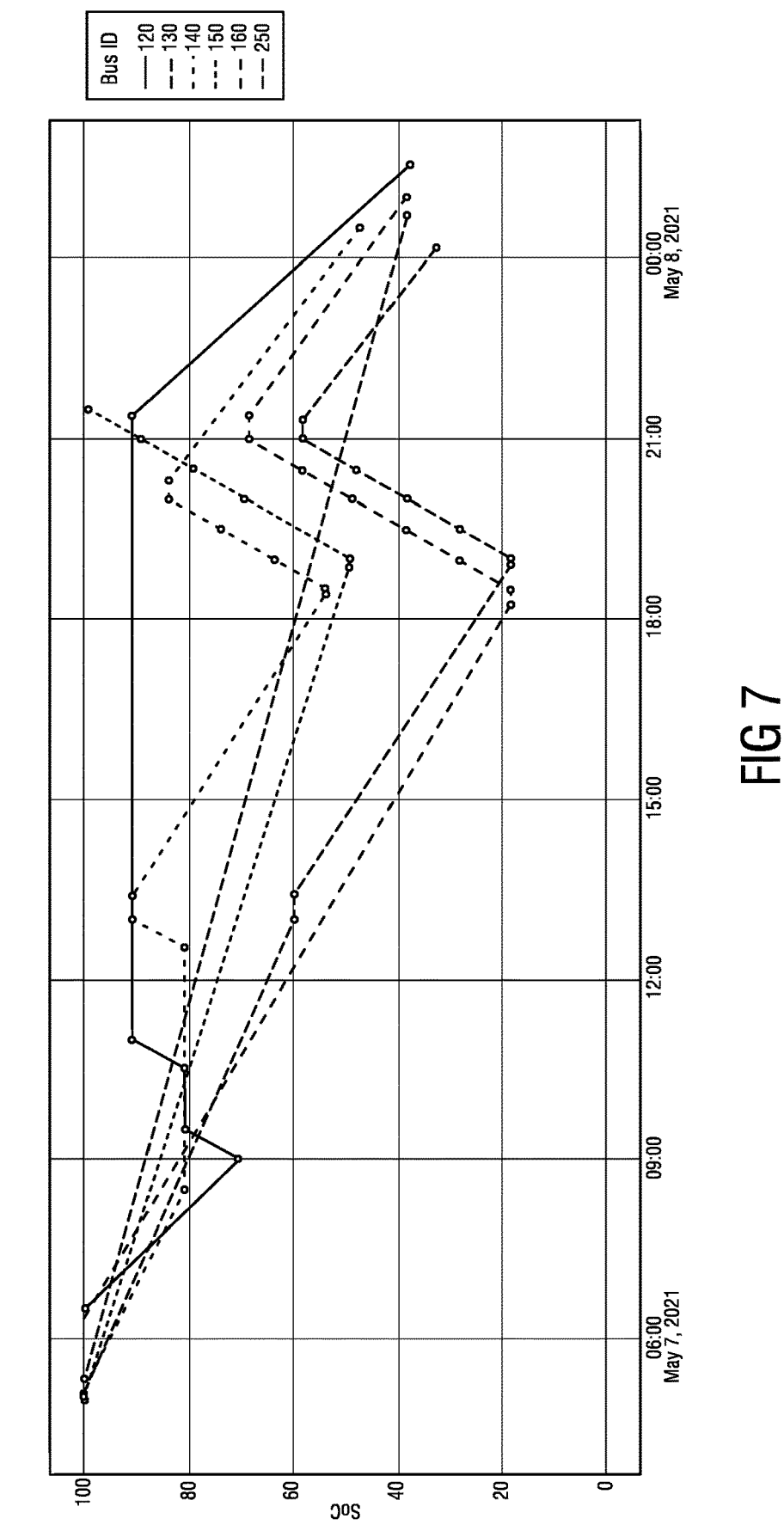
FIG. 7 is an exemplary graphical depiction of SoC con-sumption for the fleet of EVs implementing proposed solu-tion for block scheduling with intraday charging, in accor-dance with embodiments of the present invention.

FIG. 7 is an exemplary plot 700 showing SoC consumption for the fleet of EVs implementing proposed solution for block scheduling with intraday charging, in accordance with embodiments of the present invention. Herein, the SoC of the EV (represented by the Bus IDs in a range of 120 to 250) is the remaining battery capacity after completing a route. As shown, the proposed solution has resulted in a more flexible SoC model for the EV. Traditionally, the SoC model is decremental, where the battery capacity decreases with each route. The proposed scheduling algorithm, on the other hand, has increased the SoC between routes. This means that the battery capacity is replenished during intraday charging, allowing for a more flexible use of EVs.

Figures 8A, 8B:
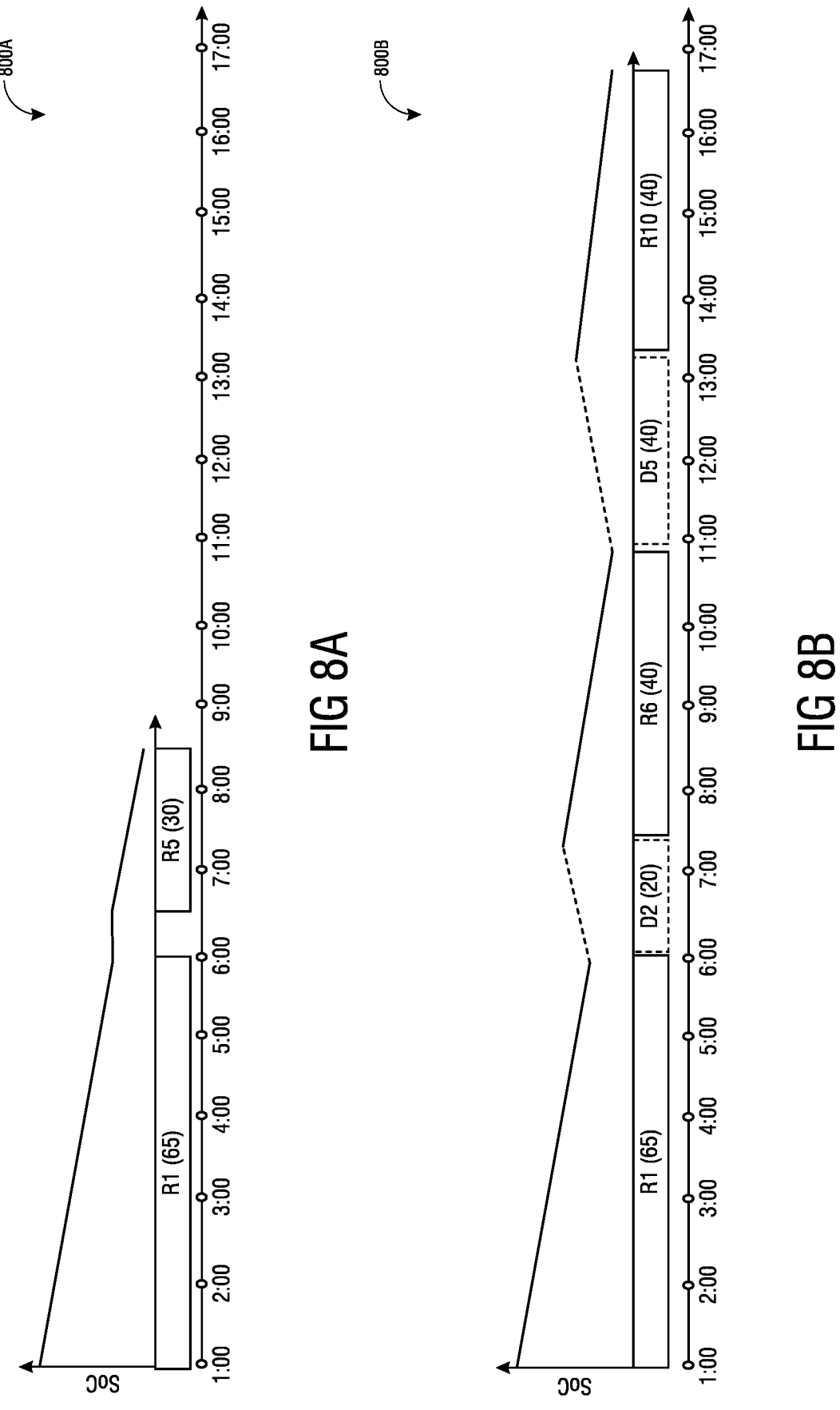
FIG. 8A is an exemplary graphical depiction of variation of SoC for an EV using existing solution based on decre-mental SoC, in accordance with embodiments of the present invention.
FIG. 8B is an exemplary graphical depiction of variation of SoC for an EV using proposed solution for block sched-uling with intraday charging, in accordance with embodi-ments of the present invention.

In embodiments, FIG. 8A is an exemplary plot 800A showing variation of SoC for an EV using existing solution based on decremental SoC; and FIG. 8B is an exemplary plot 800B showing variation of SoC for an EV using proposed solution for block scheduling with intraday charging. In implementation of existing solution as shown in the plot 800A, the SoC is assumed to gradually decrease as the EV travels along its designated routes. This assumes that the EV starts with a full charge at the beginning of its operation period and the SoC is gradually reduced as energy is consumed to cover the distance of the designated routes. This type of model does not take into account the potential for intraday charging, and therefore limits the flexibility of scheduling and the overall utilization of the EV fleet. In implementation of the proposed solution as shown in the plot 800B, the EV is assigned to the designated routes and the dummy routes in the operation period of the EV, with dummy routes representing a predefined charging time period for the battery of the EV. Thus, the proposed solution allows for intraday charging while scheduling, resulting in a flexible SoC model rather than the decremental SoC model of existing solution. The results of the proposed solution show that the EV utilization has increased by 20% on average, compared to existing approaches based on the decremental SoC model.

In embodiments, the method 100 and the system 200 of the present invention implements a MILP-based mathematical optimization approach for optimally scheduling electric vehicles considering capacity constraints and intraday charging capabilities. By introducing charging routes and modifying constraints to account for SoC limits, the scheduling algorithm addresses the challenges of intraday charging while scheduling, providing an automated technology solution that improves EV utilization, maximizes depot earnings, and contributes to lower carbon emissions. This approach has the potential to significantly enhance the efficiency and sustainability of electric vehicle fleet management systems in various industries and applications. The proposed scheduling algorithm can be integrated with existing fleet management systems, allowing operators to incorporate the advantages of the proposed approach without the need for significant changes to their existing infrastructure or processes. The proposed scheduling algorithm enables handling of large EV fleets and accommodate varying operational requirements, which may otherwise not be possible with manual approaches. Furthermore, the proposed scheduling algorithm can be adapted to consider various factors such as changes in energy costs, charging infrastructure availability, and regulatory requirements, providing a versatile and robust scheduling solution for EV fleet operators.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for block scheduling for an electric vehicle (EV), wherein daily operational time of the EV is divided into blocks, the method comprising:

obtaining route information and battery information associated with the EV, wherein the route information comprises designated routes in a defined operation period of the daily operational time for the EV and a distance to be covered in each of the designated routes for the EV, and wherein the battery information comprises a consumption factor representative of an energy consumed to cover a unit distance from a battery of the EV and a charging rate representative of the energy replenished per unit time of charging for the battery of the EV;

adding dummy routes in the defined operation period for the EV, wherein each of the dummy routes is representative of a predefined charging time period for the battery of the EV;

defining a dummy factor having a first value for each of the designated routes indicative of the energy from the battery of the EV being consumed, and a second value for each of the dummy routes indicative of the energy of the battery of the EV being replenished; and determining a schedule for the designated routes and the dummy routes for the EV by computing a solution for an optimization model having constraints for the route information, the battery information and the dummy factor, wherein the blocks are the predefined charging time period for the battery of the EV and the defined operation period for the EV.

2. The method according to claim 1, further comprising defining a battery constraint for the EV based on a maximum capacity for the battery of the EV, a pre-defined safety margin for the battery of the EV and an input state-of-charge of the battery of the EV.

3. The method according to claim 2, wherein the optimization model provides that a sum of a product of a decision variable with value being '1' if any one of the designated routes or the dummy routes is assigned to the EV and '0' otherwise, a distance of each of the designated routes and the dummy routes, the consumption factor, and the dummy factor is within '0' and the battery constraint for all of the designated routes and the dummy routes in the defined operation period for the EV.

4. The method according to claim 3, wherein the distance of each of the dummy routes is based on a ratio of a product of the charging rate the predefined charging time period over the consumption factor, for the battery for the EV.

5. The method according to claim 3, wherein the dummy factor has a value of '+1' for each of the designated routes and a value of '−1' for each of the dummy routes, for substitution in the optimization model.

6. The method according to claim 1, wherein the schedule for the designated routes and the dummy routes for the EV is determined for a time slot between an end time of a first designated route for the EV and a start time of a last designated route for the EV the defined operation period for the EV.

7. The method according to claim 1, wherein the solution for the optimization model is computed with objective to achieve a maximum distance to be covered by the EV for the designated routes therefor, in the defined operation period for the EV.

8. A system for block scheduling for an electric vehicle (EV), wherein daily operational time is divided into blocks, the system comprising:

an interface configured to obtain route information and battery information associated with the EV, wherein the route information comprises designated routes in a defined operation period of the daily operational time for the EV and a distance to be covered in each of the designated routes for the EV, and wherein the battery information comprises a consumption factor representative of an energy consumed to cover a unit distance from a battery of the EV and a charging rate representative of the energy replenished per unit time of charging for the battery of the EV;

a processor; and a memory coupled to the processor, wherein the memory comprises instructions which, when executed by the processor, configures the processor to:

add dummy routes in the defined operation period for the EV, wherein each of the dummy routes is representative of a predefined charging time period for the battery of the EV;

define a dummy factor having a first value for each of the designated routes indicative of the energy from the battery of the EV being consumed, and a second value for each of the dummy routes indicative of the energy of the battery of the EV being replenished; and determine a schedule for the designated routes and the dummy routes for the EV by computing a solution for an optimization model having constraints for the route information, the battery information and the dummy factor, wherein the blocks are the predefined charging time period for the battery of the EV and the defined operation period for the EV.

9. A computer program product, comprising a computer readable hardware storage device having computer readable program code stored therein, the computer readable program code executable by a processor of a computer system to implement a method, wherein the computer readable program code which, when executed by the processor, cause the processor to carry out the method of claim 1.

10. A computer-readable medium comprising a computer program product comprising computer program code which, when executed by a processor, cause the processor to carry out the method of claim 1.

\* \* \* \* \*